(12) United States Patent
Bittner

(10) Patent No.: US 7,207,778 B2
(45) Date of Patent: Apr. 24, 2007

(54) ROTOR AS WELL AS ROTARY-WING AIRCRAFT WITH A ROTOR

(75) Inventor: Walter Bittner, Kirchseeon (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 141 days.

(21) Appl. No.: 10/971,759

(22) Filed: Oct. 22, 2004

(65) Prior Publication Data
US 2005/0147495 A1 Jul. 7, 2005

(30) Foreign Application Priority Data
Oct. 22, 2003 (DE) ............... 103 48 981

(51) Int. Cl.
*B64C 11/40* (2006.01)
*B64C 11/04* (2006.01)
*B64C 27/04* (2006.01)

(52) U.S. Cl. ............ 416/159; 416/136; 416/141

(58) Field of Classification Search ............ 416/131, 416/136, 135, 141, 159, 103, 104, 101, 118
See application file for complete search history.

(56) References Cited

U.S. PATENT DOCUMENTS

| 4,379,678 A | 4/1983 | Carlock et al. ............ 416/98 |
| 5,011,373 A | 4/1991 | Aubry et al. |
| 5,655,878 A | 8/1997 | Yamakawa et al. ............ 416/31 |
| 6,375,426 B1 | 4/2002 | Brack et al. ............ 416/134 |

FOREIGN PATENT DOCUMENTS

| CA | 2 440 076 | 9/2002 |
| DE | 89 09 165 | 1/1990 |
| DE | 3922086 | 10/1990 |
| DE | 4329521 | 3/1995 |
| DE | 696 04 313 | 9/1996 |
| DE | 600 01 784 | 4/2001 |
| DE | 101 25 734 | 9/2002 |
| GB | 2 149 372 | 6/1985 |
| GB | 2149372 | 6/1985 |

*Primary Examiner*—Edward K. Look
*Assistant Examiner*—Dwayne J White
(74) *Attorney, Agent, or Firm*—Darby & Darby

(57) ABSTRACT

A rotor, especially for a rotary-wing aircraft, with a rotor mast and one or more adjustable rotor blades includes a rotor blade adjustment device without a swash plate and arranged on a carrier device that automatically rotates synchronously with the rotor blades, the rotor blade adjustment device rotating along with the carrier device in a manner that is free of relative movement with respect to the carrier device as well as with respect to the rotor mast and the rotor blades. The rotor blade adjustment device includes all of the blade actuators and kinematic elements required for a synchronized, cyclic and collective rotor blade adjustment as well as a control signal interface via which the control signals for the blade actuators can be transmitted from a stationary rotor section to the rotor blade adjustment device that is rotating along. Also, a rotary-wing aircraft, especially a helicopter, including at least one such rotor.

20 Claims, 1 Drawing Sheet

ROTOR AS WELL AS ROTARY-WING AIRCRAFT WITH A ROTOR

Priority is claimed to German Patent Application No. DE103 48 981.9, filed on Oct. 22, 2003, the entire disclosure of which is incorporated by reference herein.

The present invention relates to a rotor, especially for a rotary-wing aircraft, with one or more adjustable rotor blades. Moreover, the invention relates to a rotary-wing aircraft, especially a helicopter, with at least one such rotor.

BACKGROUND

As a rule, a rotor intended for a rotary-wing aircraft comprises a rotor shaft or rotor mast, a rotor head and one or more adjustable rotor blades that are non-rotatably joined via the rotor head to the rotor shaft or rotor mast. For purposes of cyclic and collective blade angle adjustment, such a rotor has an actuation system whose essential elements are a mixer lever gear with actuators and a control linkage, a swash plate that has a non-rotating part and a rotating part, that is arranged around the rotor shaft or rotor mast and that interacts with the mixer lever gear, said rotor also has a swash plate carrier as well as blade control rods that interact with the swash plate and with the rotor blades or with their blade adjustment levers. In order to effectuate the cyclic and collective control or blade angle adjustment, the swash plate can be moved in the axial direction of the rotor shaft by means of the mixer lever gear and it can be tilted in several planes.

With more modern rotor concepts—which are known as fly-by-wire or fly-by-light controls—the cell-sided parts of the control linkage, which extend all the way to the swash plate, or even the entire mixer lever gear are replaced by electric conductors or fiber-optical waveguides. Control signals generated by the pilot are transmitted via these conductors. These control signals then, in turn, control actuators that move the swash plate. Special control variants such as, for example, the so-called higher harmonic control (HHC), which is especially advantageous for suppressing noise and vibration on the rotor, do not perform satisfactorily with this technology.

Moreover, rotors with individual blade control (IBC) are known. With such a rotor, the control rods from the swash plate to the blade adjustment levers of the rotor blades are replaced with lengthwise adjustable actuators. These actuators are regulated individually and thus control the rotor blades individually.

The report titled "Eighteenth European Rotorcraft Forum," Paper No. 16, "Development of active control technology in the rotating system, flight testing and theoretical investigations" describes a rotor having IBC with which the individually controllable, lengthwise adjustable actuators are supported on a rotating part of a swash plate that can be moved and tilted axially, said actuators extending away from this part approximately parallel to the lengthwise direction of the rotor shaft upwards to the blade adjustment levers. When the rotor rotates, the actuators revolve around the rotor shaft together with the rotating part of the swash plate and with the rotor blades. Thus, there is a relative movement between the actuators and the stationary part of the swash plate as well as between the rotating part of the swash plate and the rotor shaft.

German utility model G 89 09 165.5 likewise discloses a rotor with IBC, which is similar to the IBC concept described in the preceding paragraph. The individually controllable, lengthwise adjustable actuators each engage at one end with a blade adjustment lever and at the other end with a swash plate-like element. German utility model G 89 09 165.5 does not indicate exactly how this swash plate-like element is configured.

All of the above-mentioned rotor concepts use a swash plate or a swash plate-like element as a mechanical component.

British patent GB 2 149 372 A discloses a coaxial rotor consisting of two individual rotors for a helicopter, having a rotor blade control with which the rotor blade adjustment of each rotor is effectuated by means of an electromotor actuator system that has an electric rotor and a stator. The stator is arranged on a hollow axle which is immovably joined to the cell structure of the helicopter and through which a drivable rotor shaft runs. The electric rotor, in turn, is arranged on an element that rotates along with the rotor blades and is joined to the rotor blades by a kind of intermediate gear. The rotor blade is adjusted by a relative movement between the electric rotor and the stator. In this concept, there is also a relative movement between those parts of the coaxial rotor that comprise the stator and those parts that comprise the electric rotor and the intermediate gear. This construction is highly complex and intricate, it is relatively heavy and it consists of many moving parts.

Moreover, rotors are known with which the rotor blade control is effectuated without a swash plate. Instead of the swash plate, a so-called control spider is used here. Among other things, this concept has a control rod extending through a hollow rotor shaft as well as a special bearing and swiveling means to make the transition from a non-rotating to a rotating part of the rotor and of the control spider system. Such rotors were used, for example, in the Westland WG13 (Lynx) helicopter or in the Bristol Sycamore helicopter. In actual practice, however, they have been replaced by more modern rotors with swash plates.

The control systems of the prior-art rotors are very safety-critical, mechanically and kinematically highly complex, they are extremely heavy due to the need to be fail-safe over a long service life, they have a large overall volume and, as a result, a high aerodynamic resistance.

Moreover, they are quite susceptible to external effects or damage, whereby—due to their design and exposed location on the rotor—they are actually at greater risk of being damaged.

SUMMARY OF THE INVENTION

An object of the present invention is to provide a simplified, effective rotor, especially for a rotary-wing aircraft, that avoids to the greatest extent possible the drawbacks entailed by the state of the art. Furthermore, a rotary-wing aircraft with such a rotor is to be provided.

The present invention provides a rotor, especially for a rotary-wing aircraft, with a rotor mast and one or more adjustable rotor blades (2), comprising the following: a rotor blade adjustment device (4) without a swash plate and arranged on a carrier device (6) that automatically rotates synchronously with the rotor blades (2), said rotor blade adjustment device (4) rotating along with the carrier device (6) in a manner that is free of relative movement with respect to said carrier device as well as with respect to the rotor mast and the rotor blades (2), said rotor blade adjustment device (4) having all of the blade actuators (8) and kinematic elements required for a synchronized, cyclic and collective rotor blade adjustment as well as a control signal interface (10) via which the control signals (S) for the blade actuators (8) can be transmitted from a stationary rotor section to the rotor blade adjustment device (4) that is rotating along.

This rotor, especially for a rotary-wing aircraft, having a rotor mast or rotor shaft and one or more adjustable rotor blades comprises the following: a rotor blade adjustment device without a swash plate and arranged on a carrier device that automatically rotates synchronously with the rotor blades, said rotor blade adjustment device rotating along with the carrier device in a manner that is free of relative movement with respect to said carrier device as well as with respect to the rotor mast and the rotor blades, said rotor blade adjustment device having all of the blade actuators and kinematic elements required for a synchronized, cyclic and collective rotor blade adjustment as well as a control signal interface via which the control signals for the blade actuators can be transmitted from a stationary rotor section to the rotor blade adjustment device that is rotating along.

Thus, the rotor according to the invention no longer has a swash plate. By the same token, there is no longer a mixer lever gear or the rods that are present between the swash plate and the blade adjustment levers in conventional rotor constructions. Moreover, the entire mechanical control is eliminated which, in conventional rotary-wing aircraft, is normally present between the blade actuators themselves or between the mixer lever gear and control elements which are arranged in a cockpit of a rotary-wing aircraft and which are to be operated by the pilot.

With the solution according to the invention, the blade actuators (preferably including any power assists and additional gears) that are needed for the synchronized, cyclic and collective rotor blade adjustment are arranged in the rotating system of the rotor at the rotor head. Unlike conventional rotors, which are equipped with a swash plate or a control spider, the rotor according to the invention consequently entails no relative movement between the rotor blade adjustment device and the rotor blades resulting from the rotation of the rotor. By the same token, the rotation of the rotor does not cause any relative movement between the blade actuators or between the associated kinematic elements and the rotor blades that are to be adjusted.

Rather, as already mentioned above, the rotor blade adjustment device without a swash plate or its blade actuators are attached to a carrier device that rotates synchronously with the rotor blades but, unlike a swash plate or a control spider, no longer needs a mechanical interface between rotating and non-rotating rotor elements or rotor head elements for purposes of the rotor blade adjustment. Therefore, complicated bearing means or corresponding kinematic elements are completely eliminated at this place on the rotor. In the simplest embodiment, the carrier device can thus be affixed rigidly and immovably to the rotor shaft or rotor mast or to a part of the rotor head that is rigidly and immovably joined thereto. The blade actuators can thus be attached in the simplest manner to the carrier device and to the blade adjustment levers or comparable components. The only moving parts needed between the adjustable rotor blades and the carrier device are merely the blade actuators themselves (this, of course, does not rule out that additional movable components be provided on the rotor according to the invention or on its rotor head).

The signals are preferably transmitted to the blade actuators electrically, capacitatively, inductively, electronically, optically or in another suitable manner, whereby mixed forms of the above-mentioned transmission forms are possible. Mechanical transmission of the control signal as found with a swash plate is not necessary. The control signal interface can thus be configured in a relatively simple, uncomplicated and lightweight manner as will still be described in greater detail below. The power is advantageously supplied to the blade actuators, likewise via a suitable interface.

The control signals for the blade actuators are preferably supplied by a control device that interacts with control elements that can be operated by the pilot of the helicopter. This control device can have, for example, suitable control electronics as well as one or more control programs for the cyclic and collective rotor control, said programs being implemented by means of control software and/or control hardware. Furthermore, the control program can comprise predefined control routines that—via the rotor blade control of a rotary-wing aircraft—allow special flight routines or flight figures. Moreover, if necessary, the control device can also be coupled to a means for flight status recognition and to an autopilot. The control characteristics of the rotor according to the invention as well as the appertaining correcting displacements of the actuators and the control properties can thus be preprogrammed and varied to a great extent. By means of the control device and the control electronics as well as the actuation of the blade actuators and of the rotor blades thus effectuated, those functions that are performed in conventional rotors by the swash plate and the associated components are simulated, that is to say, technically imitated in a realistic manner and are far superior in terms of the control characteristics.

Thus, with the solution according to the invention, the swash plate and a plurality of components that are normally associated with a swash plate are replaced by a system that can reliably simulate the functions of the swash plate and its appertaining components (such as, for example, mixer lever gear and the corresponding control rods). In other words, the rotor according to the invention has a purely "virtual" swash plate in a manner of speaking.

In this manner, the design of the rotor or of the entire rotor head can be considerably simplified and the total number of components needed as well as the number of moving parts can be considerably reduced. Furthermore, in comparison to conventional rotors or rotor head systems, a considerable amount of weight can be saved. Compared to rotors that are equipped with a swash plate, a control spider or prior-art IBC systems, the overall volume of the rotor head can also be considerably reduced which, in turn, advantageously diminishes the aerodynamic resistance of the rotor.

The actuation system of the rotor according to the invention—in comparison to prior-art rotors that have mechanical control means—is largely uncritical in terms of safety and consequently it can be configured with virtually any desired level of redundancy. The actuation system is also considerably less susceptible to external effects since it can be located in a protected place on or in the carrier device and as such is at less risk of being damaged.

Additional preferred and advantageous embodiment features of the rotor according to the present invention are described in the specification and claims.

The present invention also provides a rotary-wing aircraft, especially a helicopter, comprising at least one rotor as described above.

This rotary-wing aircraft, especially a helicopter, comprises at least one rotor as described above. The rotor is preferably a main rotor or a tail rotor. The term main rotor can also refer to a tilt rotor. With the rotary-wing aircraft according to the invention, essentially the same advantages can be achieved as those already explained in conjunction with the rotor according to the invention.

A preferred embodiment of the invention with additional design details and further advantages is described and explained below with reference to the accompanying drawing.

DETAILED DESCRIPTION

Figure 1:
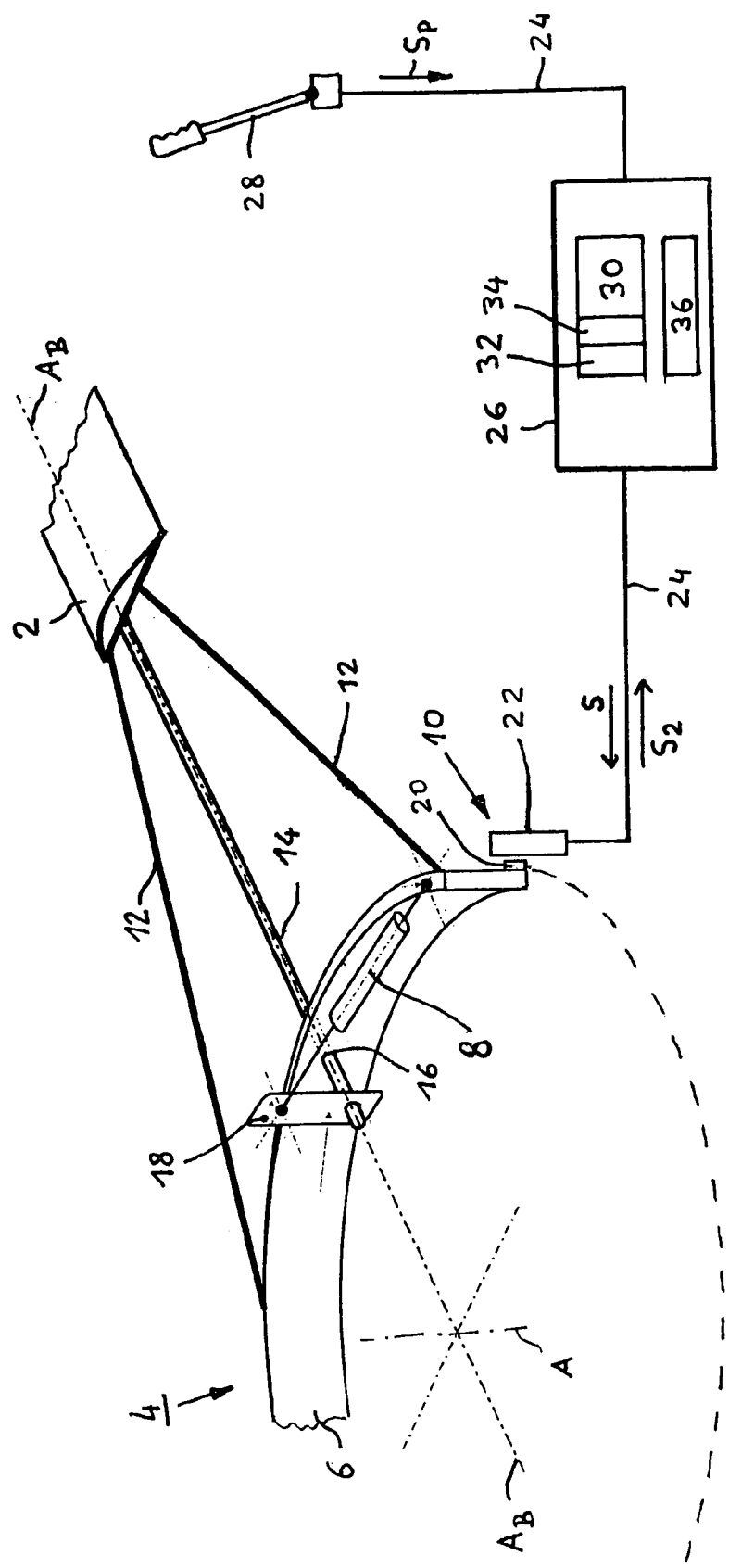
FIG. 1 shows a schematic, highly simplified and partially cut-away perspective view of an essential section of a rotor according to the invention.

FIG. 1 shows a schematic, highly simplified and partially cut-away perspective view of a rotor according to the invention in the area of its rotor head. This is the rotor of a helicopter. The rotor is provided with a rotor mast or rotor shaft. This component is not shown in the drawing. Instead, however, the letter A indicates the rotor axis defined by the rotor mast or rotor shaft. The rotor is also equipped with several rotor blades 2. For the sake of clarity, only one single rotor blade 2 is shown in the FIGURE.

The rotor according to the invention comprises a rotor blade adjustment device 4 without a swash plate, said rotor blade adjustment device being arranged on a carrier device 6 that automatically rotates synchronously with the rotor blades 2. When the rotor is in operation, the rotor blade adjustment device 4 without a swash plate rotates along with this carrier device 6 in a manner that is free of relative movement with respect to said carrier device as well as with respect to the rotor mast and the rotor blades 2. The rotor blade adjustment device 4 without a swash plate has all of the blade actuators 8 and kinematic elements required for a synchronized, cyclic and collective rotor blade adjustment as well as a control signal interface 10 via which the control signals for the blade actuators 8 can be transmitted from a stationary rotor section to a rotating rotor section and to the rotor blade adjustment device 4 that is rotating along.

In contrast to a prior-art swash plate, the carrier device 6 is configured as a carrier device without bearings and it is integrated into the rotor head. Moreover, the carrier device 6 is connected directly (or else indirectly, that is to say, via additional intermediate elements) to the rotor mast or rotor head so as to be non-rotatable and axially immovable.

As can be seen from the FIGURE, in the present embodiment, the carrier device 6 is a flat, ring-shaped housing element 6 that extends concentrically around the rotor axis A. Only a partial segment of the ring-shaped housing element 6 is shown in the FIGURE. The non-rotatable, axially immovable connection of this ring-shaped housing element 6 to the rotor shaft or to a component of the rotor head connected thereto can be effectuated, for example, by means of disk-shaped, star-shaped, flange-like or spoke-like housing sections or additional intermediate components or the like (not shown in the drawing). The housing element 6 can be armored if necessary or can be made of a bulletproof material.

Each rotor blade 2 is non-rotatably connected to the ring-shaped housing element 6 or to a partial section thereof via its blade neck 12 or via a special blade connection in the rotational direction of the rotor. However, the invention is not limited to this specific attachment method. By the same token, each rotor blade 2 can be connected to another part of the rotor head, for example, to a separate rotor star. In this example, the rotor blades 2 are configured as bearing-free and hinge-free rotor blades that have an impact-elastic and swivel-elastic as well as torsion-elastic blade neck area that assumes the function of a so-called "virtual" flapping hinge and drag hinge. The torsion elasticity here allows a rotation of the rotor 2 around a rotor blade axis $A_B$ for purposes of adjusting the blade angle. Depending on the type of helicopter or rotor, of course, other types of rotor blades can be used.

A torsion-proof control element 14, for example, a control shaft, is connected with one of its ends to the rotor blade 2 and passes with its other end through an opening 16 and through a pivot bearing into the interior of the ring-shaped housing element 6 and is non-rotatably connected to a blade adjustment lever 18.

As can also be seen in FIG. 1, the blade actuators 8 are arranged in a horizontal position inside the ring-shaped housing element 6 in a plane that is essentially parallel to a rotor circular plane (or at a slight angle thereto). Every single rotor blade 2 here is associated with at least one individually actuatable blade actuator 8 of its own. In the present example, the blade actuators 8 are lengthwise adjustable hydraulic actuators. Fundamentally, however, any other suitable blade actuators, including piezoelectric actuators or actuators equipped with intermediate gears, can be used. Using the blade actuators 8, the rotor blades 2 can be adjusted for purposes of cyclic and collective blade adjustment in an individual yet coordinated or synchronized manner. Each blade actuator 8 is affixed with one of its ends to the inner circumference of the ring-shaped housing element 6 or to an attachment section provided on the housing element 6 and with its other end to the free end of the blade adjustment lever 18. When the blade actuator 8 is actuated, the rotor blade 2 is rotated around the rotor blade lengthwise axis AB via the torsion-proof control shaft 14, as a result of which the blade angle is adjusted.

The hydraulic blade actuators 8 are supplied with power, for example, from a central supply unit, of a main gear of the helicopter via a hydraulic sliding ring or by utilizing a relative movement between the rotor head and a rotor gear housing via a rotating part. These components are not shown in the drawing.

In the embodiment variant shown in FIG. 1, the control signal interface 10 that is needed to actuate the blade actuators 8 and that corresponds to said actuators has contacting interface elements, for example, in the form of a sliding contact attached to the ring-shaped housing 6 or in the form of a sliding ring 20 with a synchronizer and a non-rotating contact 22 that is arranged on a cell of the helicopter or on a non-rotating part of the rotor. The control signal interface 10, however, can also be realized with contact-free interface elements (e.g. an optical coupling device or the like). By the same token, mixed forms of the listed types of interfaces are possible.

In the present case, the control signal interface 10 is configured in such a way that it can transmit control signals S from a non-rotating rotor element or helicopter part to the blade actuators 8 as well as optionally secondary signals $S_2$ from a rotating rotor head element to a non-rotating rotor element or helicopter part. These secondary signals $S_2$ can be, for example, measurement data from sensors arranged on the rotating part of the rotor or on its rotor blades 2. The control signal interface 10 is connected via single-channel or multi-channel data lines 24 or via a wireless data transmission link to a control device 26 as well as to control elements 28 that can be operated by the pilot of the helicopter. The entire actuation system for the rotor blades 2 here is configured as fly-by-light or fly-by-wire controls.

The control device 26 supplies the control signals S for each blade actuator 8. Depending on the flight status or control situation, the control signals S for each blade actuator 8 can be the same (for example, in case of collective rotor blade adjustment) or else different (for example, in case of cyclic rotor blade adjustment and in case of a control command generated by the pilot). The control device 26 is equipped with a data processing device 30 and control electronics 32 as well as with one or more control programs 34 for the cyclic and collective rotor control, said programs being implemented by means of control software and/or control hardware. In addition, the control program contains predefined control routines that—via the rotor blade control—allow special flight routines or flight figures for the helicopter.

The control signals S can be superimposed or mixed with control commands $S_P$ generated by the pilot. The control signals S generated by the control device 26 can be partially or completely bridged by the control commands $S_P$ of the pilot in certain states of the helicopter, so that S corresponds to the control commands $S_P$. The control device 26 optionally has a regulation device 36 or another control component that, among other things, evaluates the above-mentioned secondary signals. The control device 26 can also be coupled to a means for flight status recognition, to an autopilot or to additional sensors.

The regulation device 36 and the secondary signals $S_2$ can be used, for instance, to properly adjust the rotor blades 2 for purposes of flight position regulation or in order to avoid a collision with blade vortices. The control characteristics of the rotor according to the invention as well as the correcting displacements of the blade actuators 8 and the control properties can thus be preprogrammed and varied to a great extent. By means of the control device 26, the control electronics 32 or the control programs 34 as well as the actuation of the blade actuators 8 and of the rotor blades 2 thus effectuated, namely, those functions that are performed in conventional rotors by the swash plate and the associated components are simulated, that is to say, technically imitated in a realistic manner, and they are even superior in terms of the control characteristics.

The invention is not limited to the embodiment above, which merely serves as a general explanation of the core idea of the invention. In fact, within the scope of the protective scope, the rotor according to the invention can also assume a different embodiment from the one described in concrete terms above.

In particular, the shape of the housing element of the carrier device can vary, depending on the embodiment and application purpose of the rotor. Thus, for example, it is also possible to design the housing element to be cylindrical, bell-shaped, lens-shaped, spherical, as a polyhedron or the like. Here, too, it can have disk-shaped, star-shaped, flange-like or spoke-like sections or the like. Moreover, the housing element can be configured so as to be essentially closed or closable. Instead of a partially or completely closed housing element, the carrier device can also be configured as a platform or the like.

Diverging from the embodiment described above, the blade actuators can also be arranged outside of the housing element. Here, however, they are exposed to higher centrifugal forces as well as to external influences. Therefore, preference should be given to the attachment method described in the embodiment. Depending on the type of actuator and on the installation situation, the blade actuators can also have a different orientation relative to the rotor plane or rotor axis A and can be arranged, for example, parallel to the rotor axis or at an oblique angle to the rotor axis or rotor plane. Moreover, within the scope of the invention, the blade actuators can be installed directly on the rotor blade or they can be integrated into the rotor blade or rotor blade connection areas. This construction is especially suitable, for example, for piezoelectric actuators.

Instead of the above-mentioned control shaft 14, depending on the rotor type, it is also possible to use a so-called control pocket.

Moreover, it is possible for at least a part of the control device or for the entire control device to be arranged in or on a rotating part of the rotor. Here, the control device can be actuated, for instance, wirelessly, without the need for a special control signal interface with contacting or contact-free interface elements.

Reference numerals in the claims, in the description and in the drawings serve merely for purposes of better understanding of the invention and are not intended to limit the protective scope of the invention.

What is claimed is:

1. A rotor comprising:
    a rotor mast;
    at least one adjustable rotor blade;
    a carrier device compulsorily rotating synchronously with the at least one rotor blade;
    a rotor blade adjustment device without a swash plate disposed at the carrier device and rotating along with the carrier device such that there is no relative rotational movement between the rotor blade adjustment device, the carrier device, the at least one rotor blade and the mast, the rotor blade adjustment device including a blade actuator corresponding to the at least one rotor blade and kinematic elements required for a synchronized, cyclic and collective rotor blade adjustment; and
    a control signal interface, wherein the control signal interface is configured in such a way that it can transmit control signals from a stationary rotor section to the rotating rotor blade adjustment device as well as secondary signals from a rotating rotor head element to a non-rotating element.

2. The rotor as recited in claim 1, wherein the rotor is part of a rotary-wing aircraft.

3. The rotor as recited in claim 1, wherein the carrier device is integrated into a rotor head of the rotor.

4. The rotor as recited in claim 1, wherein the carrier device is bearingless.

5. The rotor as recited in claim 1, wherein the carrier device is connected directly or indirectly to one of the rotor mast and a rotor shaft so as to be non-rotatable relative thereto.

6. The rotor as recited in claim 1, wherein the carrier device includes a housing element and the blade actuator is disposed on an inside of the housing element.

7. The rotor as recited in claim 6, wherein the housing element is ring-shaped and extends around an axis of the rotor.

8. The rotor as recited in claim 6, wherein the housing element is armored.

9. The rotor as recited in claim 1, wherein the control signal interface includes contacting interface elements.

10. The rotor as recited in claim 1, wherein the control signal interface includes contact-free interface elements.

11. The rotor as recited in claim 1, wherein the at least one rotor blade includes a plurality of rotor blades, each associated with an individually actuatable blade actuator, and wherein the plurality of rotor blades are individually adjustable in a coordinated or synchronized manner using the blade actuators.

12. The rotor as recited in claim 1, wherein the blade actuators is disposed in a horizontal position in a plane essentially parallel to a rotor circular plane.

13. The rotor as recited in claim 1, further comprising a control device coupled to the control signal interface, the control device supplying control signals for the blade actuators and including a data processing device and a control program for at least one of a cyclic and a collective control of the rotor blade.

14. The rotor as recited in claim 13, wherein at least part of the control device is disposed in a rotating part of the rotor.

15. A rotary-wing aircraft, comprising at least one rotor according to claim 1.

16. The rotary-wing aircraft as recited in claim 15, wherein the rotary-wing aircraft is a helicopter.

17. A rotor comprising:
 a rotor mast;
 at least one adjustable rotor blade;
 a bearingless carrier device compulsorily rotating synchronously with the at least one rotor blade;
 a rotor blade adjustment device without a swash plate disposed at the carrier device and rotating along with the carrier device such that there is no relative rotational movement between the rotor blade adjustment device, the carrier device, the at least one rotor blade and the mast, the rotor blade adjustment device including a blade actuator corresponding to the at least one rotor blade and kinematic elements required for a synchronized, cyclic and collective rotor blade adjustment; and
 a control signal interface configured to transmit control signals from a stationary rotor section to the rotating rotor blade adjustment device.

18. The rotor as recited in claim 17, wherein the at least one rotor blade includes a plurality of rotor blades, each associated with an individually actuatable blade actuator, and wherein the plurality of rotor blades are individually adjustable in a coordinated or synchronized manner using the blade actuators.

19. A rotor comprising:
 a rotor mast;
 at least one adjustable rotor blade;
 a carrier device compulsorily rotating synchronously with the at least one rotor blade and including an armored housing;
 a rotor blade adjustment device without a swash plate disposed at the carrier device and rotating along with the carrier device such that there is no relative rotational movement between the rotor blade adjustment device, the carrier device, the at least one rotor blade and the mast, the rotor blade adjustment device including a blade actuator disposed on an inside of the housing element and corresponding to the at least one rotor blade and kinematic elements required for a synchronized, cyclic and collective rotor blade adjustment; and
 a control signal interface configured to transmit control signals from a stationary rotor section to the rotating rotor blade adjustment device.

20. The rotor as recited in claim 19, wherein the at least one rotor blade includes a plurality of rotor blades, each associated with an individually actuatable blade actuator, and wherein the plurality of rotor blades are individually adjustable in a coordinated or synchronized manner using the blade actuators.

* * * * *